United States Patent Office 2,799,995
Patented July 23, 1957

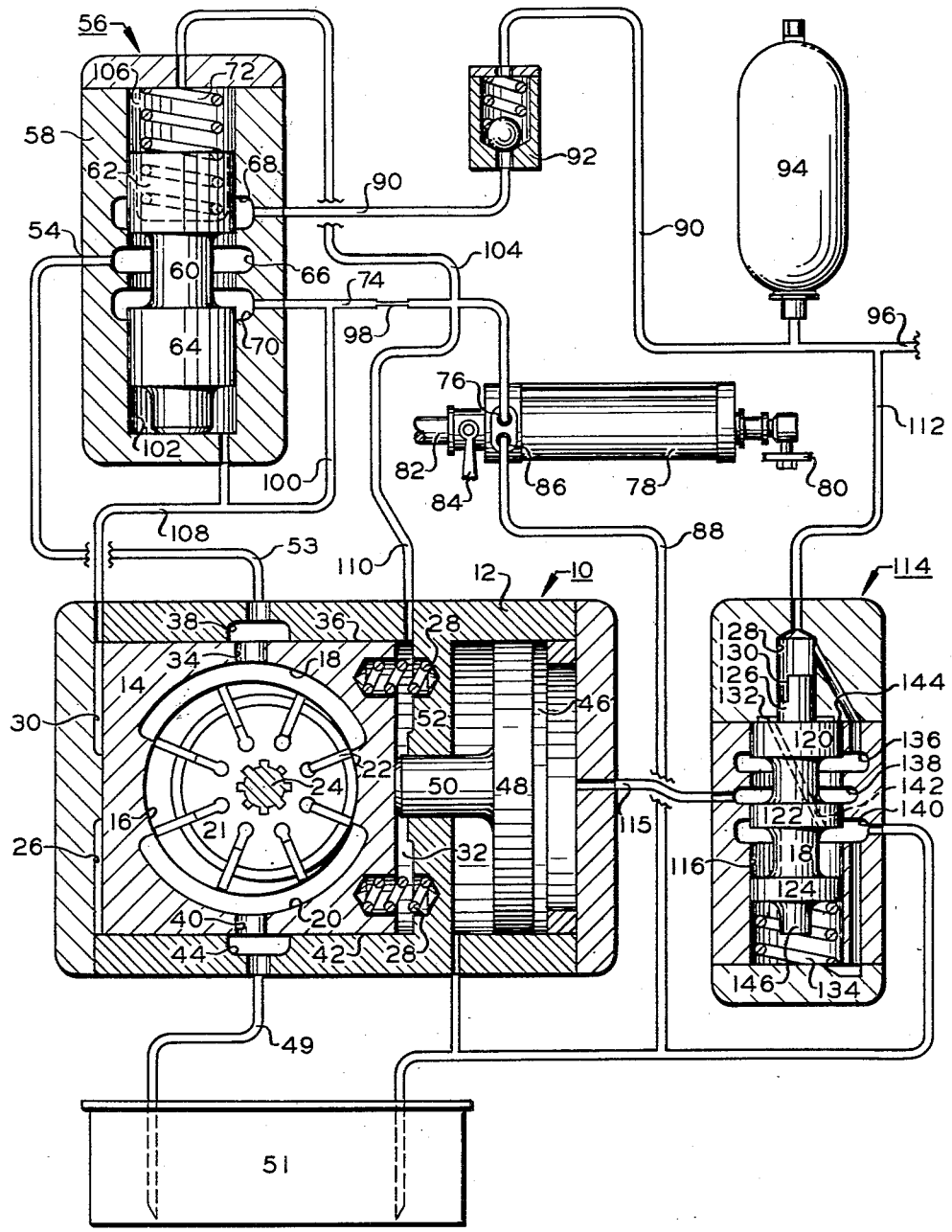

2,799,995
POWER TRANSMISSION

Kenneth R. Herman, Franklin, Mich., assignor to Vickers Incorporated, Detroit, Mich., a corporation of Michigan Application April 13, 1954, Serial No. 422,909

19 Claims. (Cl. 60—97)

This invention relates to power transmissions, and is particularly applicable to those of the type comprising two or more fluid pressure energy translating devices, one of which may function as a pump and another as a fluid motor.

More particularly the invention relates to such a power transmission particularly adapted for hydraulic operation of motor vehicle accessories.

When regarded as a prime mover for accessory drives, the engine of a motor vehicle has definite limitations. Since its operating speed may vary from perhaps 400 to 4000 revolutions per minute, the output of, for example, a fixed displacement pump driven thereby will vary in the same ratio. This problem is further complicated by the fact that certain accessories, such as a steering booster may require very substantial amounts of fluid while the engine is idling. If a fixed displacement pump is used, a large oversupply of fluid at intermediate and high speeds results. This is undesirable since it is conducive to erratic steering, power wastage, and excessive heat generation. For example, the control valve used in many steering boosters is an open center type in which machining tolerances are very closely controlled. Valve land widths may be held to axial thickness tolerances of the order of one thousandth of an inch. Such painstaking and expensive construction is utilized to give the vehicle operator a nicety and preciseness of feel which would be largely lost if the flow rate through the valve was allowed a large variance. To avoid the undesirable consequences of fluctuating fluid flow to the steering booster, the use of a variable displacement pump in which the displacement is varied as an inverse function of the car speed is an effective arrangement. However, the high cost and complexity of such variable pumps is often prohibitive where the pump is used solely to supply the steering booster. If it were possible to utilize the same pump which supplies the steering booster as a source of fluid pressure for the actuation of other hydraulically powered accessories, the high initial cost of a variable displacement pump would be economically feasible.

Hydraulic power is ideally suited for use in driving accessories other than power steering. For example, window lifts, windshield wipers, tops for convertibles, and seat position adjusters. In using a single source of fluid pressure, it is, of course, important to the safety of the vehicle that operaion of these oher accessories does not in any way affect operation of the steering booster. Use of one of the standard flow proportioning devices is not a satisfactory solution since at low speed it may be necessary to assure for the steering booster priority on the entire pump output.

Since the steering pump must have sufficient capacity to provide rapid operation of the steering gear while the engine idles, it has a large excess capacity while the engine operates at normal speeds. In the past, the usual practice with fixed displacement pumps has been to provide a spill-over type flow control valve to divert fluid pumped by that excess capacity back to the pump inlet. Where a variable displacement pump is utilized, usual practice has been to merely reduce the pump displacement below maximum capacity to maintain flow to the gear constant. Whichever practice was followed, the pumping mechanism had volumetric capacity which went unused or was wasted.

It is an object of the present invention to provide an improved, low cost, hydraulic power transmisison for operating a plurality of fluid motors from a single pump.

It is a further object to provide such a transmission which is particularly well adapted for use with a variable speed prime mover such as the engine of a motor vehicle.

Another object is to provide such a transmission which will insure that a particular primary motor, for example a steering motor, has priority over a secondary motor, or motors, on the entire pump output, up to a predetermined rate.

It is also an object to provide such a transmission which utilizes the excess capacity of the pump which supplies the steering booster to provide pressure fluid for actuation of other vehicle accessories.

It is a further object to provide such a transmission in which the pump is of the variable displacement type and the displacement thereof is subject to a system of dual control, whereby the displacement is varied in response to both flow rate to a primary motor and demand by a secondary motor.

Further objects and advantages of the present invention will be apparent from the following description, reference being had to the accompanying drawing wherein a preferred form of the present invention is clearly shown.

In the drawing, the single figure is a diagrammatic view of a power transmission system incorporating a preferred form of the present invention.

The transmission includes a variable displacement pump 10 which is intended to be driven by the engine of a motor vehicle not shown. The pump 10 includes a body member 12 having a ring member 14 therein. The ring 14 includes a circular pumping chamber 16 having a discharge port 18 and an inlet port 20. A rotor 21 having radially slidable vanes 22 therein is mounted on a drive shaft 24 which is drivingly connected to the engine of a motor vehicle, not shown. Ports 18 and 20 are narrower in axial thickness than ring 14 and vanes 22 thus the outer ends of the vanes will follow the circular contour of chamber 16. The ring 14 is shiftable radially of rotor 21 in a chamber 26 and is biased by springs 28 to the illustrated position, wherein the eccentricity between the chamber 16 and the rotor 21 is a maximum. The ring member 14 divides the chamber 26 into a pair of opposed pressure chambers 30 and 32, to which chambers ring 14 presents equal and opposed areas. A discharge passage 34 extends through the ring 14 to the face 36 thereof where it communicates with a recess 38 in the body 12. A similar passage 40 extends to the face 42 of ring 14 where it communicates with a recess 44. The recesses 38 and 44 are of sufficient length so that the passages 34 and 40 are in continuous communication therewith throughout the full path of travel of ring 14. The rotor 21 will be driven in a clockwise direction by the prime mover thus making port 18 the discharge port and port 20 the inlet port.

The body 12 of pump 10 includes a third pressure chamber 46 with a piston 48 therein having a rod 50 which extends through the wall 52 into the pressure chamber 32 to contact the ring 14. The arrangement of the pressure chambers 30 and 32 in the body 12 of pump 10, is such that when the pressure differential between chambers 30 and 32 becomes of sufficient magnitude, the springs 28 will be overcome and the ring 14 will shift so as to reduce the eccentricity between the rotor and pumping chamber and thus reduce the displacement of the pump. As will hereinafter be described, override pressure can be applied to pressure chamber 46 to exert a force through a piston 48 and its rod 50 to move the ring 14 to a position of maximum displacement, regardless of the pressure differential between chambers 30 and 32.

An inlet conduit 49 extends from a reservoir 51 to communicate with the inlet port of the pumping mechanism. A conduit 53 extends from the outlet port of the pumping mechanism to communicate with the inlet port 54 of a combination shutoff and flow control valve generally designated 56. Valve 56 comprises a body 58 having a spool 60 therein. Spool 60 includes a pair of lands 62 and 64 which control communication between the central annulus 66 and a pair of annuli 68 and 70. The valve spool 60 is biased by a spring 72 to the position illustrated, wherein conduit 53 is in unrestricted communication through annuli 66 and 70 with a conduit 74, while communication between conduit 54 and the annulus 68 is blocked by the land 62.

Conduit 74 extends from the annulus 70 in the valve 56 to the inlet port 76 of a steering booster 78. Booster 78 may be of the type described in the patent to Vickers, No. 2,022,698, and is fixed to the frame of the vehicle at 80, connected to the vehicle steering linkage by a rod 82, and controlled by a pitman arm 84. The booster return port 86 is connected by a conduit 88 to the reservoir 51. The control valve of the steering booster 78 is of the conventional open center design which requires a substantially constant rate of fluid flow therethrough for best operation.

The conduit 90 extends from the annulus 68 of valve 56 through a check valve 92 to communicate with an accumulator 94. A conduit 96 extends from the accumulator 94 to communicate with intermittently operated accessories, not shown.

The conduit 74 includes flow restricting means indicated at 98. From a point ahead of the restriction 98, a conduit 100 extends to the valve 56 and communicates with a pressure chamber 102 at one end of the valve bore. A conduit 104 extends from a point downstream of the restriction 98 to communicate with a pressure chamber 106 at the opposite end of the valve bore, thus subjecting equal and opposed areas of the valve spool 60 to pressures upstream and downstream of restriction 98.

Another conduit 108 extends from upstream of the restriction 98 to communicate with the pressure chamber 30 in the body 12 of the pumping mechanism 10. A conduit 110 extends from a point downstream of restriction 98 to communicate with the pressure chamber 32 of the pump 10. Pressures from upstream and downstream of restriction 98 are thus exerted on equal and opposed areas of the pump ring 14 and also the valve spool 60. The pressure drop caused by flow through the restriction 98 is effective to control the positions both of valve spool 60 and ring member 14 in a manner to be hereinafter described.

A conduit 112 extends from conduit 90 downstream of the check valve 92 to communicate with a snap acting control valve 114. Control valve 114 functions to port pressure fluid through a conduit 115 to the chamber 46 to induce maximum displacement of pump 10 regardless of the pressure differential between chambers 30 and 32. The control 114 includes a stepped valve bore 116 having a valve spool 118 therein. The valve spool 118 has three lands thereon, namely 120, 122, and 124, and includes a small diameter portion 126 which extends into the reduced diameter 128 of valve bore 116. The reduced portion 126 has a flat 130 thereon which, on movement of the valve, is effective to establish communication between the reduced portion 128 and a pressure chamber 132 at the end of the larger diameter of the valve bore 116. A spring 134 biases the valve spool 118 to the position illustrated, wherein the annulus 136 is in communication with the annulus 138, and the pressure chamber 132 communicates with the annulus 140 through an angular drilled hole 142 which extends through the lands 120 and 122.

In the normal spring biased position of valve spool 118, the pressure in the accumulator will be conducted through conduit 112, annulus 136, annulus 138, and conduit 115 to the pressure chamber 46. When the pump 10 is operating, pressure in the accumulator 94 will normally be of sufficient magnitude, when imposed on the area of piston 48, to move the ring member 14 to the maximum displacement position regardless of the pressure conditions existing in pressure chambers 30 and 32. Pressure in the accumulator 94 is also imposed on the small diameter 126 of the valve spool 118 and acts to move spool 118 against the spring 134. As the accumulator pressure moves the valve spool 118 against the spring, at some predetermined pressure, for example 1000 pounds per square inch, the flat 130 will establish communication between the small diameter 128 of the valve bore 116 and the pressure chamber 132 to expose an additional annular area 144 to the accumulator pressure.

At the same time area 144 is subjected to pressure, the land 122 interrupts communication between chamber 132 and annulus 140 via the annular drilled hole 142. The additional force thus exerted on spool 118 will snap the spool to a position established by abutment of stop 146 and the end of valve bore 116. In this position, land 120 blocks communication between annuli 136 and 138 and communication is established between the annuli 136 and 138. Thus, in the pressure actuated position of valve spool 118, the pressure chamber 46 will be vented to the reservoir and the ring member 14 of the pumping mechanism will be free to assume any position dictated by the springs 28 and the pressure differential between chamber 30 and chamber 32. Because of the added area 144 subjected to accumulator pressure on shifting of the valve 118, the accumulator pressure must drop to some value considerably lower than 1000 pounds per square inch, for example, 800 pounds per square inch before the valve spool 118 will return to the spring biased position wherein the pumping mechanism is urged toward maximum displacement. Valve 114 is representative of many arrangements, controllable by accumulator pressure differential, which could be utilized to port pressure fluid to chamber 46.

In operation, with the accumulator 94 fully charged the valve 118 will be held in a position such as to vent the pressure chamber 46 as hereinbefore noted. The position of the shiftable ring member 14 will thus be established solely by the differential in pressure between pressure chambers 30 and 32 and the assembled loads and rates of springs 28. As heretofore noted, the pressure chamber 30 communicates with the conduit 74 at a point upstream of the restriction 98 and pressure chamber 32 is in communication with conduit 74 downstream of the restriction 98. The pressure differential across the restriction 98 is proportional to the rate of fluid flow in conduit 74. Springs 28 are so selected that when the rate of fluid flow in conduit 74 reaches a predetermined maximum, the pressure drop across restriction 98, and hence the differential between the pressure chambers 30 and 32, will be sufficient to overcome springs 28 thus shifting the ring 14 in a direction such as to reduce the displacement of the pump 10. Any increase in flow rate through the restriction 98 caused by increase in vehicle engine speed will result in a corresponding increment in pressure differential between chambers 30 and 32, thus further reducing the displacement of pump 10. At all flow rates above that at which displacement reduction is initiated, the pumping mechanism will compensate for changes in the speed of the prime mover to maintain the flow rate across restriction 98 within a narrow range. The steering booster 78 is thus assured of a substantially constant supply of pressure fluid regardless of variation of the vehicle engine speed. Further, this arrangement assures that there is no excess volume of pressure fluid being pumped to cause useless dissipation of power.

The assembled load of spring 72 is preferably so selected that the valve 60 will be maintained in the illustrated position until the pressure differential across restriction 98 very slightly exceeds that pressure differential which is required to move the ring 14 of pump 10 to the minimum displacement position. Valve 60 thus maintains free communication between conduits 53 and 74 and blocks communication between conduit 53 and conduit 90 throughout the full range of displacement variation of pump 10, as long as accumulator 94 is fully charged.

As the pressure in accumulator 94 drops to say, 800 pounds, as heretofore noted, valve 118 will shift so as to port pressure fluid from the accumulator 94 to the pressure chamber 46. Pressure in chamber 46 acting on the area of piston 48 will exert a force on the ring member 14 causing it to shift to the maximum displacement position, regardless of the pressure differential across restriction 98. Since the pressure differential across restriction 98 no longer controls displacement of the pumping mechanism 10, the flow rate in conduit 74 will tend to exceed the maximum permitted during flow compensated operation of the pump. However, as previously discussed, valve 60 will be shifted against spring 72 when the pressure differential across restriction 98 very slightly exceeds that amount which was required to induce minimum displacement of pump 10. Valve 60 will thus move upwardly against spring 72 and land 64 will restrict communication between the annuli 66 and 70 while at the same time opening communication between the annuli 66 and 68.

Spring 72 is selected to have a very low rate thus the valve 60 can move to highly restrict communication between conduits 54 and 74 with a very small increase in the pressure differential across the restriction 98. As the flow rate in conduit 74 tends to exceed that rate at which the pressure drop across the restriction 98 induces initial movement of spool 60, the land 64 will meter fluid to the conduit 74 at a rate such to maintain the pressure drop across restriction 98 within a narrow range.

The fluid being pumped by pump 10 in excess of that required to maintain a substantially constant pressure drop across restriction 98 is thus diverted from the conduit 53 to the conduit 90, passing through the check valve 92 to charge the accumulator 94 and supply accessories connected to the conduit 96. Valve 60 will continue to maintain a relatively constant flow rate in conduit 74 during override operation while diverting fluid pumped in excess of this amount to conduit 90 until the accumulator 94 becomes fully charged at say, 1000 pounds per square inch, and valve 119 is actuated to vent chamber 46 as previously discussed. Operation then becomes as first discussed with the displacement of pumping mechanism 10 being varied to maintain a substantially constant flow rate to the steering booster 78.

There has thus been provided a transmission system for operation of a plurality of fluid motors supplied with fluid from a single pump driven at variable speeds. One motor has been assured priority over another, although both may be operated concurrently. Power loss has been minimized since the volume of fluid pumped is always dependent on the actual demands of the system. All these advantages have been obtained by the use of simple, rugged, and trouble-free hydraulic components.

While the form of embodiment of the invention as herein disclosed constitutes a preferred form, it is to be understood that other forms might be adopted, all coming within the scope of the claims which follow.

What is claimed is as follows:

1. In a hydraulic transmission for use with a variable speed prime mover, the combination of: a variable displacement pump; primary and secondary circuits supplied with fluid by said pump; control means responsive to increasing flow rate in the primary circuit to reduce the pump displacement and thus regulate the flow rate in said primary circuit; and means responsive to reduction of pressure in said secondary circuit to override said control means and increase the pump displacement irrespective of flow rate in said primary circuit.

2. In a hydraulic transmission for use with a variable speed prime mover, the combination of: a variable displacement pump; primary and secondary circuits supplied with fluid by said pump; control means responsive to increasing flow rate in the primary circuit to reduce the pump displacement and thus regulate the flow rate in said primary circuit; means responsive to reduction of pressure in said secondary circuit to override said control means and increase the pump displacement irrespective of flow rate in said primary circuit; and flow control means in said primary circuit effective during override operation to prevent excessive flow therein.

3. In a hydraulic transmission for use with a variable speed prime mover, the combination of: a variable displacement pump; primary and secondary circuits supplied with fluid by said pump, said primary circuit requiring a continuous supply of fluid and said secondary circuit including an accumulator and requiring intermittent supply; control means responsive to increasing flow rate in the primary circuit to reduce the pump displacement and thus regulate the flow rate in said primary circuit; and means responsive to pressure drop in said secondary circuit to override said control means and increase the pump displacement irrespective of flow rate in said primary circuit.

4. In a hydraulic transmission for use with a variable speed prime mover, the combination of: a variable displacement pump; primary and secondary circuits supplied with fluid by said pump, said primary circuit requiring a continuous supply of fluid and said secondary circuit including an accumulator and requiring intermittent supply; control means responsive to increasing flow rate in the primary circuit to reduce the pump displacement and thus regulate the flow rate in said primary circuit; means responsive to pressure drop in said secondary circuit to override said control means and increase the pump displacement irrespective of flow rate in said primary circuit; and flow control means in said primary circuit effective during override operation to prevent excessive flow therein.

5. In a hydraulic transmission for use with a variable speed prime mover, the combination of: a variable displacement pump; primary and secondary circuits supplied with fluid by said pump; control means responsive to increasing flow rate in the primary circuit to reduce the pump displacement and thus regulate the flow rate in said primary circuit; means responsive to reduction of pressure in said secondary circuit to override said control means and increase the pump displacement irrespective of flow rate in said primary circuit; flow control means in said primary circuit effective during override operation to prevent excessive flow therein; and valve means normally isolating said pump from said secondary circuit, said valve means being responsive to an increase in flow rate in said primary circuit, beyond that rate permitted by said first mentioned control means, to establish communication between said pump and said secondary circuit.

6. In a hydraulic power transmission for use with a variable speed prime mover, the combination of: a fluid pump driven by said prime mover; primary and secondary circuits supplied with fluid by said pump; flow restricting means in said primary circuit for producing a pressure differential dependent on the flow rate in that circuit; a flow regulating valve in said primary circuit responsive to an increase in said pressure differential to increasingly restrict said primary circuit and thus regulate the flow rate therein; and valve means normally blocking said secondary circuit and responsive to said pressure differential to open said secondary circuit only after flow restricting movement of said flow regulating valve, thus providing priority for said primary circuit at low prime mover speeds.

7. In a hydraulic power transmission for use with a variable speed prime mover, the combination of: a fluid pump driven by said prime mover; primary and secondary circuits supplied with fluid by said pump; flow restricting means in said primary circuit for producing a pressure differential dependent on the flow rate in that circuit; a flow regulating valve in said primary circuit responsive to an increase in said pressure differential to increasingly restrict said primary circuit and thus regulate the flow rate therein; and valve means shiftable conjointly with said flow regulating valve, said valve means normally blocking said secondary circuit and effective to open said secondary circuit on flow restricting movement of said flow regulating valve.

8. In a hydraulic system for use with pumping structure having a member shiftable to vary the displacement thereof, the combination of: a pair of fluid consuming devices; fluid conduit means interconnecting said pumping structure and each of said pair of devices; means in one of said conduits for producing a pressure differential dependent on the flow rate in that conduit; control means for utilizing said differential pressure to position said shiftable member and thus regulate the flow rate in said one conduit; means for controlling the position of said shiftable member irrespective of said differential pressure, to override the first named control means; and flow controlling valve means utilizing said differential pressure for controlling the flow rate in said one conduit to prevent excessive flow therein.

9. In a hydraulic system for use with pumping structure having a member shiftable to vary the displacement thereof, the combination of: a pair of fluid consuming devices; fluid conduit means interconnecting said pumping structure and each of said pair of devices; means in one of said conduits for producing a pressure differential dependent on the flow rate in that conduit; control means for utilizing said differential pressure to position said shiftable member and thus regulate the flow rate in said one conduit; means for controlling the position of said shiftable member irrespective of said differential pressure, to override the first named control means; means responsive to said differential pressure for opening and closing the other of said conduits; and flow controlling valve means utilizing said differential pressure for controlling the flow rate in said one conduit to prevent excessive flow therein.

10. In a hydraulic system for use with pumping structure having a member shiftable to vary the displacement thereof, the combination of: a pair of fluid consuming devices; fluid conduit means interconnecting said pumping structure and each of said pair of devices; means in one of said conduits for producing a pressure differential dependent on the flow rate in that conduit; control means for utilizing said differential pressure to position said shiftable member and thus regulate the flow rate in said one conduit; means for controlling the position of said shiftable member irrespective of said differential pressure, to override the first named control means; and flow controlling valve means utilizing said differential pressure for controlling the flow rate in said one conduit to prevent excessive flow therein, and having associated therewith means for opening and closing the other of said conduits.

11. In a hydraulic system for use with pumping structure having a member shiftable to vary the displacement thereof, the combination of: a pair of fluid consuming devices, the first of said pair requiring a constant supply of fluid and the second requiring only an intermittent supply; fluid conduit means interconnecting said pumping structure and each of said pair of devices; means in that one of said conduits leading to said first device for producing a pressure differential dependent on the flow rate in that conduit; control means for utilizing said differential pressure to position said shiftable member and thus regulate the flow rate in said one conduit; means responsive to reduction of pressure, due to demand by said second device, for controlling the position of said shiftable member irrespective of said differential pressure, to override the first named control means; and flow controlling valve means utilizing said differential pressure for controlling the flow rate in said one conduit to prevent excessive flow therein.

12. In a hydraulic system for use wtih pumping structure having a member shiftable to vary the displacement thereof, the combination of: a pair of fluid consuming devices, the first of said pair requiring a constant supply of fluid and the second requiring only an intermittent supply; fluid conduit means interconnecting said pumping structure and each of said pair of devices; means in that one of said conduits leading to said first devices for producing a pressure differential dependent on the flow rate in that conduit; means for utilizing said differential pressure to position said shiftable member and thus regulate the flow rate in said one conduit; means responsive to reduction of pressure, due to demand by said second device, for controlling the position of said shiftable member irrespective of said differential pressure, to override the first named control means; means responsive to said differential pressure for opening and closing the other of said conduits; and flow controlling valve means utilizing said differential pressure for controlling the flow rate in said one conduit to prevent excessive flow therein.

13. In a hydraulic system for use with pumping structure having a member shiftable to vary the displacement thereof, the combination of: a pair of fluid consuming devices, the first of said pair requiring a constant supply of fluid and the second requiring only an intermittent supply; fluid conduit means interconnecting said pumping structure and each of said pair of devices; means in that one of said conduits leading to said first device for producing a pressure differential dependent on the flow rate in that conduit; means for utilizing said differential pressure to position said shiftable member and thus regulate the flow rate in said one conduit; means responsive to reduction of pressure, due to demand by said second device, for controlling the position of said shiftable member irrespective of said differential pressure, to override the first named control means; and flow controlling valve means utilizing said differential pressure for controlling the flow rate in said one conduit to prevent excessive flow therein, and having associated therewith means for opening and closing the other of said conduits.

14. In a hydraulic system for use with pumping structure having a member shiftable to vary the displacement thereof, the combination of: a pair of fluid consuming devices, the first of said pair requiring a constant supply of fluid and the second including an accumulator and requiring only an intermittent supply; fluid conduit means interconnecting said pumping structure and each of said pair of devices; means in that one of said conduits leading to said first devices for producing a pressure differential dependent on the flow rate in that conduit; means for utilizing said differential pressure to position said shiftable member and thus regulate the flow rate in said one conduit; means responsive to the pressure in said accumulator for controlling the position of said shiftable member irrespective of said differential pressure, to override the first named control means; and flow controlling valve means utilizing said differential pressure for controlling the flow rate in said one conduit to prevent excessive flow therein.

15. In a hydraulic system for use with pumping structure having a member shiftable to vary the displacement thereof, the combination of: a pair of fluid consuming devices, the first of said pair requiring a constant supply of fluid and the second including an accumulator and requiring only an intermittent supply; fluid conduit means interconnecting said pumping structure and each of said pair of devices; means in that one of said conduits leading to said first device for producing a pressure differential dependent on the flow rate in that conduit; means for utilizing said differential pressure to position said shiftable member and thus regulate the flow rate in said one conduit; snap acting means responsive to the pressure in said accumulator for controlling the position of said shiftable member irrespective of said differential pressure, to override the first named control means; and flow controlling valve means utilizing said differential pressure for controlling the flow rate in said one conduit to prevent excessive flow therein.

16. In a hydraulic system for use with pumping structure having a member shiftable to vary the displacement thereof, the combination of: a pair of fluid consuming devices, the first of said pair requiring a constant supply of fluid and the second including an accumulator and requiring only an intermittent supply; fluid conduit means interconnecting said pumping structure and each of said pair of devices; means in that one of said conduits leading to said first device for producing a pressure differential dependent on the flow rate in that conduit; means for utilizing said differential pressure to position said shiftable member and thus regulate the flow rate in said one conduit; means responsive to the pressure in said accumulator for controlling the position of said shiftable member irrespective of said differential pressure, to override the first named control means; means responsive to said differential pressure for opening and closing the other of said conduits; and flow controlling valve means utilizing said differential pressure for controlling the flow rate in said one conduit to prevent excessive flow therein.

17. In a hydraulic system for use with pumping structure having a member shiftable to vary the displacement thereof, the combination of: a pair of fluid consuming devices, the first of said pair requiring a constant supply of fluid and the second including an accumulator and requiring only an intermittent supply; fluid conduit means interconnecting said pumping structure and each of said pair of devices; means in that one of said conduits leading to said first device for producing a pressure differential dependent on the flow rate in that conduit; means for utilizing said differential pressure to position said shiftable member and thus regulate the flow rate in said one conduit; means responsive to the pressure in said accumulator for controlling the position of said shiftable member irrespective of said differential pressure, to override the first named control means; and flow controlling valve means utilizing said differential pressure for controlling the flow rate in said one conduit to prevent excessive flow therein, and having associated therewith means for opening and closing the other of said conduits.

18. In a hydraulic system for use with pumping structure having a member shiftable to vary the displacement thereof, the combination of: a pair of fluid consuming devices; fluid conduit means interconnecting said pumping structure and each of said pair of devices; means in one of said conduits for producing a pressure differential dependent on the flow rate in that conduit; means for utilizing said differential pressure to position said shiftable member and thus regulate the flow rate in said one conduit; means for controlling the position of said shiftable member irrespective of said differential pressure to override the first named control means; and a single valve member in said conduit means, said valve member having a normal position in which said one conduit is open and the other conduit is blocked, said valve member being shiftable in response to said pressure differential to open said other conduit and restrict flow in said one conduit.

19. In a hydraulic power transmission for use with a variable speed prime mover, the combination of: a fluid pump driven by said prime mover; primary and secondary circuits supplied with fluid by said pump and extending from a common junction point; flow restricting means in said primary circuit downstream of said junction point for producing a pressure differential dependent on the flow rate in that circuit; a flow regulating valve in said primary circuit downstream of said junction point responsive to an increase in said pressure differential to increasingly restrict said primary circuit and thus regulate the flow rate therein; and an accumulator and check valve in said secondary circuit, whereby pressure build-up caused by the restrictive action of said flow control valve will open the check valve to charge the accumulator.

References Cited in the file of this patent

UNITED STATES PATENTS

| | | |
|---|---|---|
| 2,573,563 | Gardiner | Oct. 30, 1951 |
| 2,674,092 | Gardiner | Apr. 6, 1954 |